Figure 1:
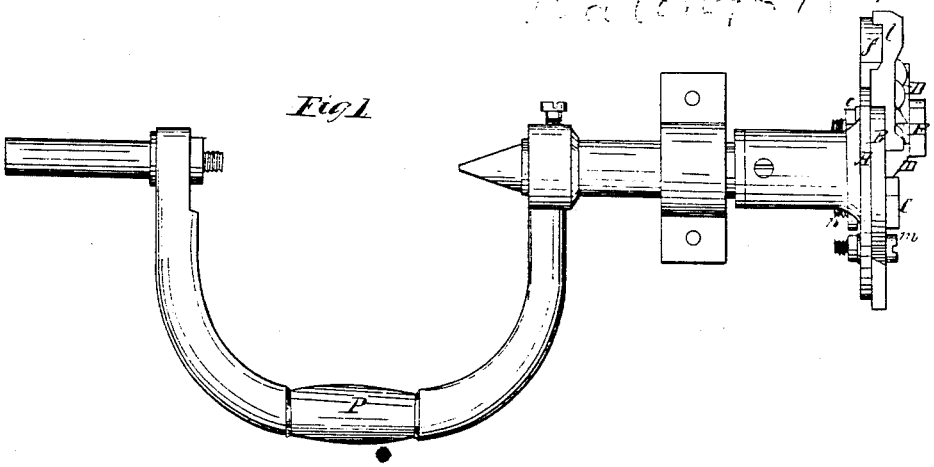
Figure 2:
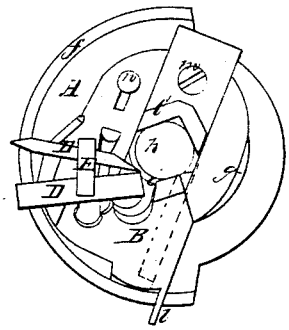
Figure 3:
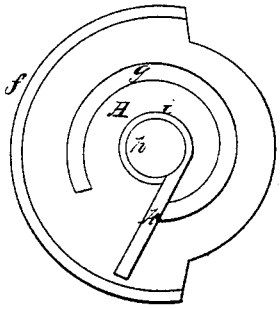

30-435
SR
[redacted]
35091 OR AI 279
[redacted]

M. Gregg,

Hollow Auger,

No. 279, A.I. Patented May 15, 1860.

Witnesses,
C. Bazer
William Gregg

Inventor.
Mahlon Gregg

AM. PHOTO-LITHO. CO. N.Y. (OSBORNE'S PROCESS.)